US006622646B1

(12) United States Patent
Bennett et al.

(10) Patent No.: US 6,622,646 B1
(45) Date of Patent: Sep. 23, 2003

(54) MOUNTING ASSEMBLY FOR HYDRAULIC COUPLING

(75) Inventors: Robert Edwin Bennett, Moline, IL (US); Bradley John Meyer, Davenport, IA (US); William Douglas Graham, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/219,016

(22) Filed: Aug. 14, 2002

(51) Int. Cl.$^7$ ............................................... A62C 13/76
(52) U.S. Cl. ............................ 111/52; 111/200; 248/49; 248/75; 285/61; 280/421
(58) Field of Search ..................... 111/52, 200; 248/75, 248/89, 90, 91, 79, 80, 65, 74.1, 74.2, 68.1, 56, 49, 220.21, 222.12, 222.22, 222.31, 222.41, 222.43, 222.42, 222.11, 225.11; 285/61, 62; 280/421; 138/89

(56) References Cited

U.S. PATENT DOCUMENTS

| 4,422,327 A | * 12/1983 | Anderson | 73/303 |
| 4,438,660 A | * 3/1984 | Kittle | 74/531 |
| 5,082,217 A | 1/1992 | Parker et al. | 248/75 |
| 5,336,039 A | * 8/1994 | House | 414/621 |
| 6,213,739 B1 | * 4/2001 | Phallen et al. | 417/478 |

OTHER PUBLICATIONS

John Deere Operator's Manual, "7200 Drawn MaxEmerge 2 Planter 6–Row Wide 8–Row Narrow", Front page, Introduction page, pp. 17–20, Oct. 1982.
John Deere Operator's Manual, "7340 Narrow–Row MaxEmerge 2 Integral Planters", Cover page, p. 95–11, Received in the Patent Department Dec. 21, 1987.

* cited by examiner

Primary Examiner—Christopher J. Novosad

(57) ABSTRACT

A case drain coupler mounting plate is mounted to the frame of the seeding machine. The case drain hydraulic coupler is secured to the case drain coupler mounting plate when it is not coupled to a tractor. The mounting plate is provided with a keyhole-shaped mounting aperture having an enlarged upper opening and a narrow channel projecting downwardly from the enlarged opening. The case drain hydraulic coupler is provided with a circumferential groove that engages the narrow channel in the keyhole shaped slot. A backing plate is mounted to the mounting plate at a fixed distance from the mounting plate. The backing plate engages the case drain hydraulic coupler and overcomes the biasing force to open the check valve. With the check valve open the case drain line provides a drain path for hydraulic fluid from the case drain.

17 Claims, 3 Drawing Sheets

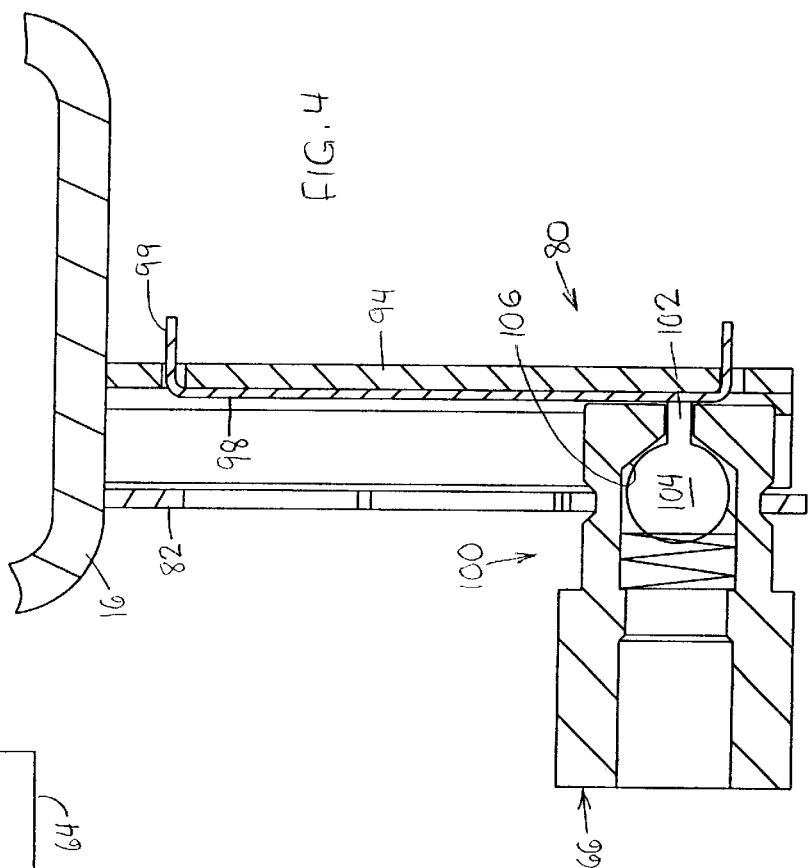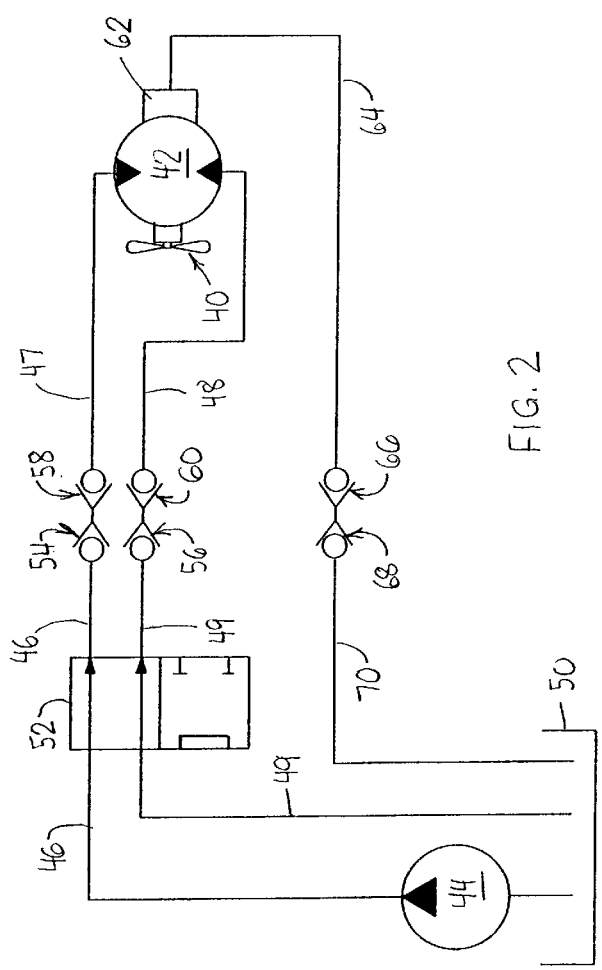

MOUNTING ASSEMBLY FOR HYDRAULIC COUPLING

FIELD OF THE INVENTION

The present invention is directed to a mounting assembly for a hydraulic coupling having a check valve, wherein the check valve is maintained in an open position by the mounting assembly.

BACKGROUND OF THE INVENTION

Agricultural implements, such as seeding machines, may use pneumatic pressure to meter seed. Some seeding machines use positive air pressure and others use negative air pressure (vacuum). The pneumatic pressure is generated by a fan that is typically driven by a hydraulic motor. The hydraulic motor is hydraulically coupled to a tractor mounted hydraulic pump. The hydraulic pump directs pressurized hydraulic fluid through a hydraulic pressure passage past a tractor mounted control valve through a hydraulic pressure line to the hydraulic motor. Exhausted hydraulic fluid is returned through a hydraulic exhaust line past the control valve through an exhaust fluid passage to a tractor mounted sump. Hydraulic fluid that leaks past the seals of the hydraulic motor is directed to a case drain. The case drain is coupled to a case drain line that returns the hydraulic fluid collected in the case drain to the hydraulic sump.

As the agricultural implements can be detached from the tractor, the implement is typically provided with hydraulic couplings. The hydraulic couplings are mounted to the various hydraulic lines and are directly coupled to receiving hydraulic ports located on the tractor. Each of the hydraulic couplings is provided with a check valve that is biased closed. The check valves are opened when the hydraulic couplings are mounted to the hydraulic ports and closed when the hydraulic couplings are removed from the ports.

When farmers attach the agricultural implement to the tractor they sometimes forget to mount the case drain line to the case drain port on the tractor. As the flow in the case drain line is checked by the case drain check valve, the motor seal may become displaced resulting in damage to the seals. Oil from the motor will then leak over the main frame of the agricultural implement and the motor will have to be repaired or replaced.

SUMMARY OF THE INVENTION

It is an object of the present invention to provide a mounting assembly for a case drain line of an agricultural implement that will keep the case drain check valve open to prevent damage to the motor seals of a hydraulic motor.

An agricultural implement in the form of a seeding machine is provided with a hydraulic motor having a hydraulic pressure line, a hydraulic exhaust line and a hydraulic case drain line. The hydraulic case drain line is provided with a case drain coupler having a check valve that is biased closed.

A case drain coupler mounting plate is mounted to the frame of the seeding machine. The case drain coupler is secured to the case drain coupler mounting plate when it is not coupled to a tractor. The mounting plate is provided with a keyhole-shaped mounting aperture having an enlarged upper opening and a narrow channel projecting downwardly from the enlarged opening. The case drain hydraulic coupler is provided with a circumferential groove that engages the narrow channel in the keyhole shaped slot. A backing plate is mounted to the mounting plate at a fixed distance from the mounting plate. The backing plate engages the case drain hydraulic coupler and overcomes the biasing force to open the check valve. With the check valve open, the case drain line provides a drain path for hydraulic fluid from the case drain even if it is not coupled to a tractor port.

BRIEF DESCRIPTION OF THE DRAWINGS

FIG. 2 is a hydraulic schematic of to hydraulic motor for the vacuum seed meter fan.

FIG. 4 is a cross sectional view of the case drain mounting plate and case drain hydraulic coupling.

DETAILED DESCRIPTION

Figure 1:
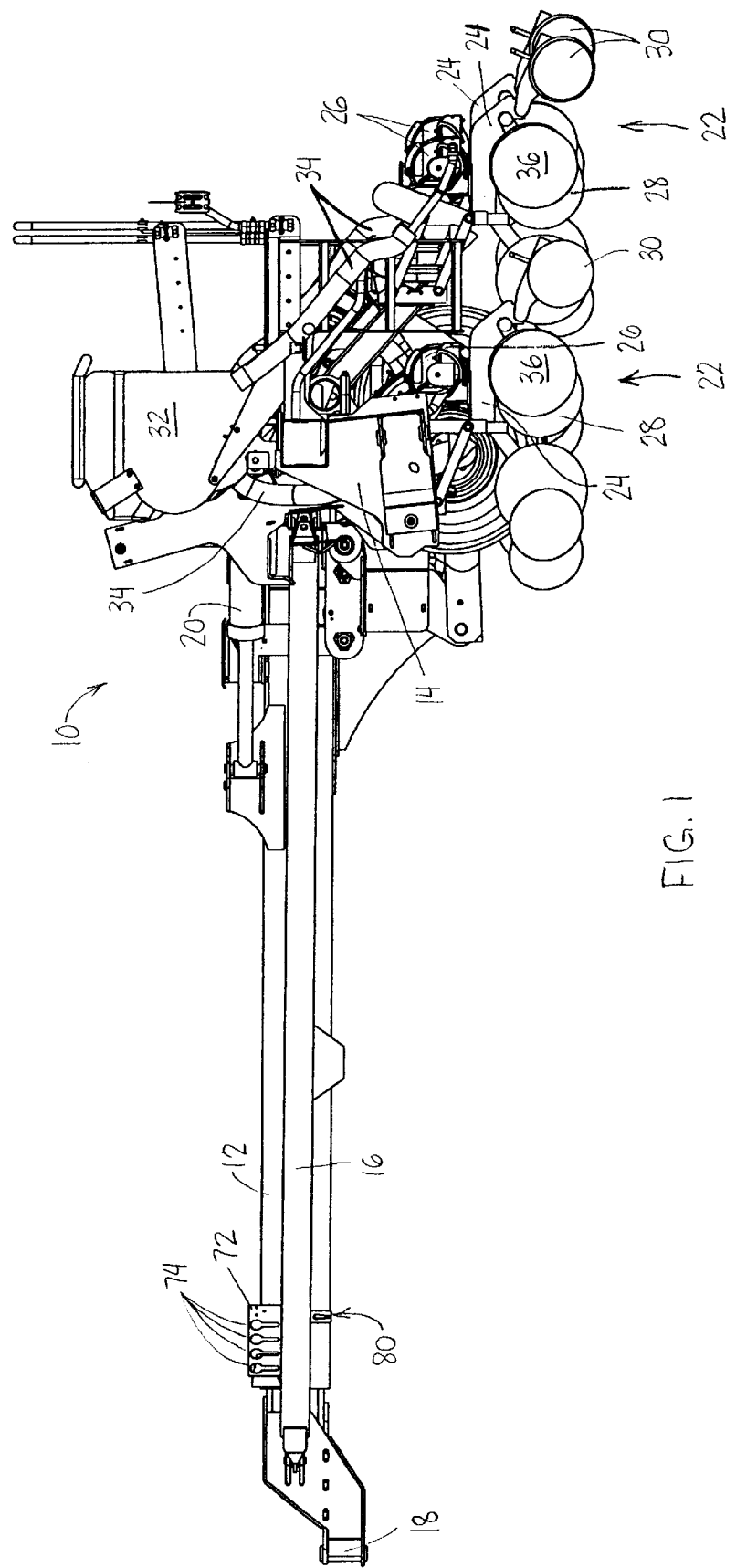
FIG. 1 is a side view of a seeding machine.
Figure 3:
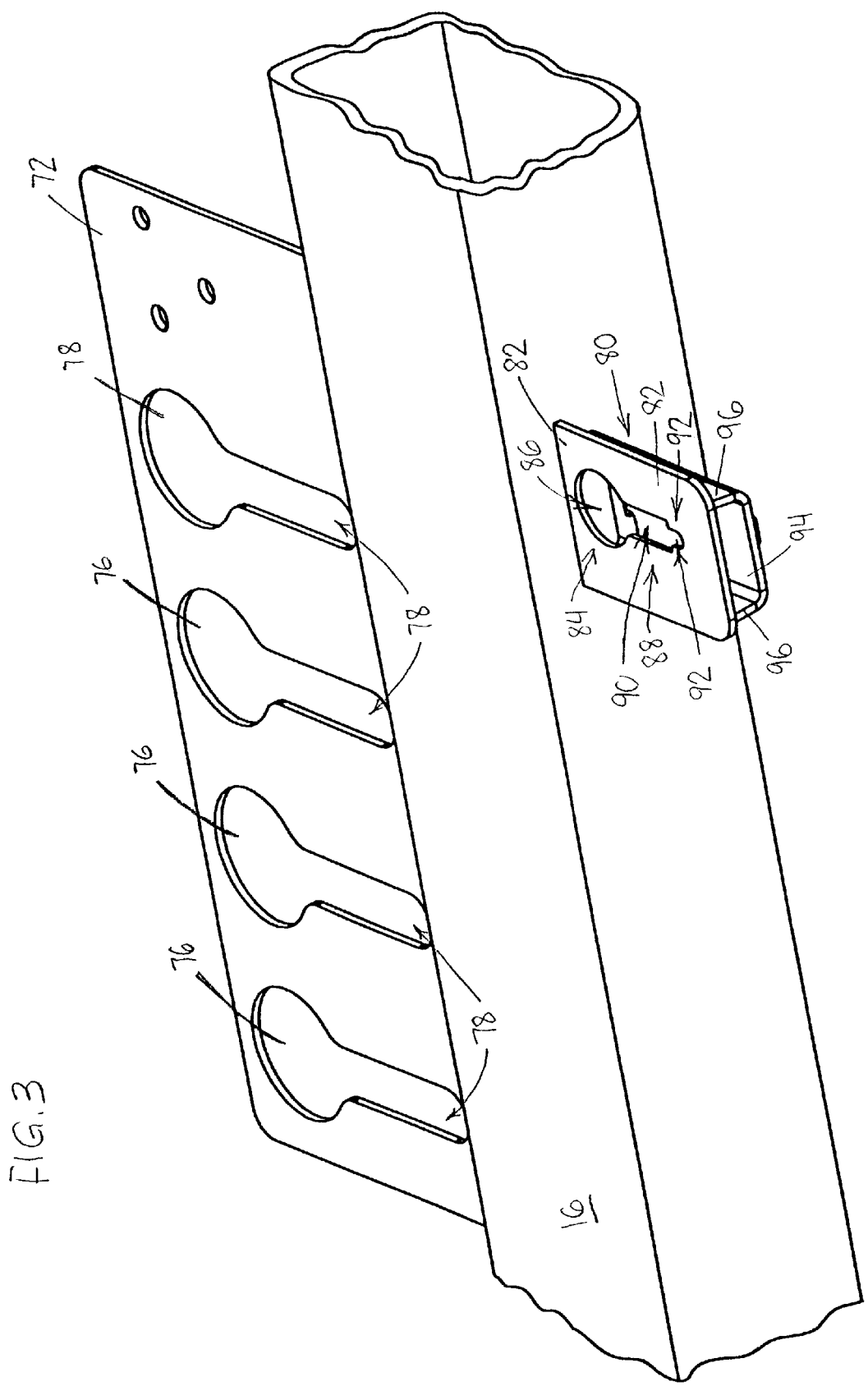
FIG. 3 is an enlarged perspective view of a draft link and the case drain mounting assembly.

FIG. 1 is a side view of a towed agricultural implement in the form of a seeding machine 10. The seeding machine 10 is provided with a frame formed by a tow bar 12, a planter unit support frame 14 and draft links 16. The tow bar 12 extends forwardly from a planter unit support frame 14 and is provided with a hitch 18 that is coupled to a tractor. The planter unit support frame 14 has three frame segments, a central frame segment, a left wing frame segment and a right wing frame segment. The wing frame segments can be pivoted relative to the central frame segments about fore/aft extending pivots. These fore/aft extending pivots permit the wing frame segments to better follow the contour of the ground as the seeding machine 10 is being pulled through the field. The wing frame segments can also be folded in a forward manner about vertically extending pivots by hydraulic cylinders 20, so that the seeding machine 10 assumes a more narrow transport configuration. The wing frame segments are coupled to the tow bar 12 by draft links 16.

The planter unit support frame 14 is provided with a plurality of planting units 22. Each of the planting units 22 comprise a frame 24, a seed meter 26, a furrow opener 28 and closing wheels 30. Seed from a central hopper 32 is directed to the individual planting units 22 by gravity through seed hoses 34. Each of the seed meters 26 has an associated auxiliary hopper into which the seed is deposited before metering. The seed from the auxiliary hopper is metered by the seed meter 26 and directed to a seed tube, not shown. The seed tube directs the metered seed into a planting furrow formed by the furrow opener 28. The depth of the planting furrow is controller by depth gauging wheels 36. Although the present invention is illustrated as being used on a gravity feed seed system, it could also be used on a pneumatic seed on demand system wherein pneumatic pressure directs seed automatically to the auxiliary hoppers.

The illustrated seed meters 26 are vacuum seed meters. That is the illustrated seed meters 26 use a vacuum (negative air pressure) to attract seed to a rotating seed disc located in the seed meter housing. Positive pneumatic pressure seed meters could also be used.

The pneumatic pressure for the seed meter is generated by a fan 40. The fan 40 is driven by a hydraulic motor 42. Pressurized hydraulic fluid from hydraulic pump 44 is directed through tractor hydraulic pressure passage 46 to implement hydraulic pressure line 47 to the motor 42. Exhausted hydraulic fluid is directed through implement exhaust line 48 to tractor exhaust passage 49 to hydraulic sump 50. The flow of pressurized hydraulic fluid to the hydraulic motor 42 is controlled by valve 52. The pump 44, valve 52, sump 50 and associated hydraulic passages are located on the tractor. The tractor is also provided with pressure port 54 and exhaust port 56.

Implement pressure line 47 is coupled to the pressure port 54 by a hydraulic pressure line coupling 58. Similarly, the implement exhaust line 48 is coupled to exhaust port 56 by hydraulic exhaust line coupling 60. Both ports 54 and 56 and both couplings 58 and 60 are provided with check valves which are biased closed. The check valves are opened when the couplings 58 and 60 are coupled to the ports 54 and 56 completing the flow path between the passages and the respective hydraulic lines. When the couplings 58 and 60 are uncoupled from the ports 54 and 56 the check valves close to prevent the loss of hydraulic fluid.

To protect the seals of the hydraulic motor 42, the motor is provided with a case drain 62. The case drain 62 is hydraulically coupled to an implement case drain line 64 having a case drain hydraulic coupling 66. The coupling 66 is coupled to case drain port 68 located on the tractor. The case drain port 68 is coupled to tractor case drain passage 70 which directs hydraulic fluid from the case drain 62 to sump 50. As with the pressure and exhaust ports 54 and 56 and couplings 58 and 60 the case drain coupling 66 and the case drain port 68 are provided with check valves to prevent the flow of fluid from these lines when they are decoupled from one another.

One of the draft links 16 is provided with a hydraulic coupling mounting plate 72. This mounting plate 72 has four keyhole-shaped mounting apertures 74 for receiving hydraulic couplers 58 and 60 and the hydraulic couplers associated with hydraulic cylinders mounted on the seeding machine 10. The keyhole-shaped apertures 74 have an enlarged upper opening 76 and a downwardly extending narrow channel 78. Each of the hydraulic couplings 58 and 60 has a circumferential groove. The hydraulic coupling is inserted into the enlarged opening 76 and slid downwardly so that the circumferential channel engages the sidewalls of the channel 78. Such structures are already known in the art for holding hydraulic couplings of hydraulic lines when not in use.

The present invention is directed to the case drain mounting assembly 80 which is mounted to the same draft link 16 as mounting plate 72. The case drain mounting assembly 80 comprises a mounting plate 82 having a keyhole-shaped mounting aperture 84. The keyhole shaped mounting aperture 84 has an enlarged circular upper opening 86 and a narrow downwardly extending channel 88. The downwardly extending channel 88 has an upper portion 90 adjacent to the enlarged upper opening 86 and a lower portion 92 remote from the enlarged upper opening 86. The upper portion 90 of the channel 88 being wider than the lower portion 92 to accommodate different sized hydraulic couplers.

A backing plate 94 having legs 96 is mounted to the case drain mounting plate 82. The legs 96 define a distance between the backing plate 94 and the mounting plate 82. The distance is designed to open the case drain check valve 100 when it is mounted to the mounting plate 82. More specifically, the check valve 100 is provided with an engagement pin 102 that is depressed into the check valve 100 by engagement with the backing plate 94. The engagement pin 102 pushes the valve element 104 away from the valve seat 106 opening the check valve 100. In addition, a slight gap is formed between the front face of the case drain check valve 100 and the backing plate 94. In this way a drainage path from the case drain 62 is opened to atmosphere.

If a smaller case drain hydraulic coupling 66 is used having a shorter engagement pin 102, an insert plate 98 maybe attached to the backing plate 94 to shorten the distance required to open the check valve 100. The insert plate 98 is provided with tangs 99 for engaging mounting slots located in backing plate 94.

Having described the preferred embodiment, it will become apparent that various modifications can be made without departing from the scope of the invention as defined in the accompanying claims.

What is claimed is:

1. A mounting assembly for a hydraulic coupling having a check valve, the check valve being biased into a closed position, the mounting assembly comprising:

a mounting plate having a mounting aperture, the mounting plate having a front surface and a rear surface, the mounting aperture extending through the plate from the front to the rear surface, the mounting aperture is sized to receive and hold the hydraulic coupling;

a backing plate being located behind the mounting plate, the backing plate being positioned a distance from the mounting plate so that the check valve is automatically opened to atmosphere when the hydraulic coupling is mounted in the mounting aperture.

2. The mounting assembly as defined by claim 1 wherein the hydraulic coupling is provided with an engagement pin that engages the backing plate when the hydraulic coupling is mounted in the mounting aperture opening the check valve.

3. The mounting assembly as defined by claim 2 wherein the mounting t aperture is a keyhole-shaped slot having an enlarged upper opening for receiving the hydraulic coupling and a narrow channel for holding the hydraulic coupling.

4. The mounting assembly as defined by claim 3 wherein the backing plate is mounted to the mounting plate.

5. The mounting assembly as defined by claim 4 wherein the backing plate has two legs that engage the mounting plate and define the distance between the backing plate and the mounting plate.

6. The mounting assembly as defined by claim 5 wherein the narrow channel of the keyhole-shaped slot has an upper portion adjacent to the enlarged upper opening and a lower portion remote from the enlarged upper opening, the upper portion being wider than the lower portion to accommodate different sized hydraulic couplers.

7. The mounting assembly as defined by claim 6 wherein the backing plate is provided with an insert plate to accommodate hydraulic couplings having engagement pins that are shorter than can be depressed directly by the backing plate.

8. An agricultural implement for performing an agricultural operation, the agricultural implement comprising:

a frame;

a hydraulic motor being mounted to the frame, the hydraulic motor having a hydraulic pressure line with a hydraulic pressure line coupling, a hydraulic exhaust line with an exhaust line hydraulic coupling and a hydraulic case drain line with a hydraulic case drain line hydraulic coupling, the case drain hydraulic coupling being provided with a check valve for preventing the flow of hydraulic fluid out of the case drain hydraulic line, the check valve of the case drain hydraulic coupling is biased into a closed position, the case drain hydraulic coupling is provided with a circumferential groove;

a mounting plate is mounted to the frame, the mounting plate being provided with a mounting aperture, the mounting plate having a front surface and a rear surface, the mounting aperture extending through the plate from the front surface to the rear surface, the mounting aperture is sized to receive and hold circumferential groove of the case drain hydraulic coupling;

a backing plate being located behind the mounting plate, the backing plate being positioned a distance from the mounting plate so that the check valve of the case drain hydraulic coupling is automatically opened to atmosphere when the case drain hydraulic coupling is mounted in the mounting aperture.

9. The agricultural implement as defined by claim 8 wherein check valve of the case drain hydraulic coupling is provided with an engagement pin that engages the backing plate when the case drain hydraulic coupling is mounted in the mounting aperture opening the check valve.

10. The agricultural implement as defined by claim 9 wherein the mounting aperture is a keyhole-shaped slot having an enlarged upper opening for receiving the case drain hydraulic coupling and a narrow channel for holding the circumferential groove of the case drain hydraulic coupling.

11. The agricultural implement as defined by claim 10 wherein the backing plate is mounted to the mounting plate.

12. The agricultural implement as defined by claim 11 wherein the backing plate has two legs that engage the mounting plate and define the distance between the backing plate and the mounting plate.

13. The agricultural implement as defined by claim 12 wherein the narrow channel of the keyhole-shaped slot has an upper portion adjacent to the enlarged upper opening and a lower portion remote from the enlarged upper opening, the upper portion being wider than the lower portion to accommodate different sized circumferential grooves.

14. The agricultural implement as defined claim 13 wherein the backing plate is provided with an insert plate to accommodate case drain hydraulic couplings having engagement pins that are shorter than can be depressed directly by the backing plate.

15. The agricultural implement as defined by claim 12 further comprising a furrow opener that is mounted to the frame.

16. The agricultural implement as defined by claim 15 further comprising a pneumatic pressure seed meter that is mounted to the frame.

17. The agricultural implement as defined by claim 16 further comprising a fan for generating pneumatic pressure, the fan being driven by the hydraulic motor.

* * * * *